United States Patent
Oroskar et al.

(10) Patent No.: US 10,313,955 B2
(45) Date of Patent: Jun. 4, 2019

(54) CARRIER AGGREGATION (CA) FOR USER EQUIPMENT (UE) AND WIRELESS RELAYS

(71) Applicant: Sprint Communications Company L.P., Overland Park, KS (US)

(72) Inventors: Siddharth Oroskar, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/836,269

(22) Filed: Dec. 8, 2017

(65) Prior Publication Data

US 2018/0103412 A1    Apr. 12, 2018

Related U.S. Application Data

(63) Continuation of application No. 15/154,947, filed on May 14, 2016, now Pat. No. 9,877,263.

(51) Int. Cl.
*H04W 40/22* (2009.01)
*H04W 4/06* (2009.01)
*H04W 72/04* (2009.01)
*H04L 12/26* (2006.01)
*H04W 76/27* (2018.01)

(52) U.S. Cl.
CPC ............ *H04W 40/22* (2013.01); *H04L 43/16* (2013.01); *H04W 4/06* (2013.01); *H04W 72/042* (2013.01); *H04W 72/0413* (2013.01); *H04W 72/0486* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 8,817,623 | B2 | 8/2014 | Gupta et al. |
| 8,954,009 | B2 | 2/2015 | Pedersen et al. |
| 8,995,331 | B2 | 3/2015 | Kazmi et al. |
| 9,001,727 | B2 | 4/2015 | Yang et al. |
| 9,668,171 | B2 | 5/2017 | Gupta et al. |
| 2013/0016649 | A1 | 1/2013 | Damnjanovic et al. |
| 2013/0322371 | A1 | 12/2013 | Prakash et al. |

(Continued)

FOREIGN PATENT DOCUMENTS

| | | |
|---|---|---|
| CN | 102638803 | 8/2012 |
| EP | 2385716 | 11/2011 |
| WO | 2011115347 | 9/2011 |

*Primary Examiner* — Alex Skripnikov

(57) ABSTRACT

A wireless relay receives a user network Identifier (ID) and a relay network ID. The wireless relay attaches to the relay network responsive to the relay network ID. The wireless relay broadcasts the user network ID and User Equipment (UEs) attach to the wireless relay responsive to the user network ID. The wireless relay exchanges user data with the UEs over user network carrier aggregation links. The wireless relay exchanges the user data with the relay network over relay network carrier aggregation links. Responsive to carrier aggregation loading, the wireless relay receives an instruction to terminate the user network carrier aggregation links, and the wireless relay terminates the user network carrier aggregation links. The wireless relay now exchanges the user data with the UEs over non-carrier aggregation links. The wireless relay continues to exchange the user data with the relay network over the relay network carrier aggregation links.

20 Claims, 8 Drawing Sheets

(56) References Cited

U.S. PATENT DOCUMENTS

| | | |
|---|---|---|
| 2013/0336198 A1 | 12/2013 | Kim et al. |
| 2014/0010086 A1 | 1/2014 | Etemad et al. |
| 2014/0307623 A1 | 10/2014 | Gheorghiu et al. |
| 2015/0156695 A1 | 6/2015 | Zhang et al. |
| 2015/0215852 A1 | 7/2015 | Gou et al. |
| 2015/0223149 A1 | 8/2015 | Liu et al. |
| 2015/0288566 A1 | 10/2015 | Sadek |
| 2015/0334637 A1 | 11/2015 | Kim et al. |
| 2016/0119216 A1 | 4/2016 | Zuo et al. |

US 10,313,955 B2

CARRIER AGGREGATION (CA) FOR USER EQUIPMENT (UE) AND WIRELESS RELAYS

RELATED CASES

This patent application is a continuation of U.S. patent application Ser. No. 15/154,947 that was filed on May 14, 2016 and is entitled "CARRIER AGGREGATION (CA) FOR USER EQUIPMENT (UE) AND WIRELESS RELAYS." U.S. patent application Ser. No. 15/154,947 is hereby incorporated by reference into this patent application.

TECHNICAL BACKGROUND

Data communication systems exchange user data to provide various services like media streaming, audio/video conferencing, data messaging, and internet access. The data communication systems use several communication networks to transfer the user data. In particular, the data communication systems use wireless networks to provide mobile and convenient access to their data services. Exemplary wireless communication protocols include Long Term Evolution (LTE) and Wireless Fidelity (WIFI). In wireless networks, the LTE and WIFI protocols typically carry the user data in Internet Protocol (IP) packets.

To implement wireless access, User Equipment (UE) and network base stations exchange wireless signals that transport user data and network signaling. The network base stations communicate with each other and core networks. Carrier Aggregation (CA) is often used on the wireless link between the UEs and the network base stations.

CA allocates additional bandwidth to UEs and relays in the form of Orthogonal Frequency Division Multiplex (OFDM) resource blocks. These simultaneous OFDM resource blocks may be contiguous and non-contiguous, and they may be intra-band or inter-band. Thus, the base stations and UEs exchange user data over parallel streams by using multiple CA resource blocks per OFDM time period.

To extend wireless access beyond the network base stations, wireless relays are deployed between the UEs and the base stations. The wireless relays exchange the user data between the UEs and the network base stations to extend data services like internet access, voice calling, and video conferencing to these UEs. CA is also used between the UEs and wireless relays, and between the wireless relays and the network base stations.

CA requires the various receiving devices to return acknowledgement signals (ACKs). The ACK load may become oppressive, especially for Downlink (DL) CA that transmits the ACKs on a thin Uplink (UL). Network base stations may turn CA off in times of radio interference, buffer overload, and the like. Unfortunately, network base stations do not effectively and efficiently control CA in wireless networks that use wireless relays.

TECHNICAL OVERVIEW

A wireless relay receives a user network Identifier (ID) and a relay network ID. The wireless relay attaches to the relay network responsive to the relay network ID. The wireless relay broadcasts the user network ID and User Equipment (UEs) attach to the wireless relay responsive to the user network ID. The wireless relay exchanges user data with the UEs over user network carrier aggregation links. The wireless relay exchanges the user data with the relay network over relay network carrier aggregation links. Responsive to carrier aggregation loading, the wireless relay receives an instruction to terminate the user network carrier aggregation links, and the wireless relay terminates the user network carrier aggregation links. The wireless relay now exchanges the user data with the UEs over non-carrier aggregation links. The wireless relay continues to exchange the user data with the relay network over the relay network carrier aggregation links.

DETAILED DESCRIPTION

Figure 1:
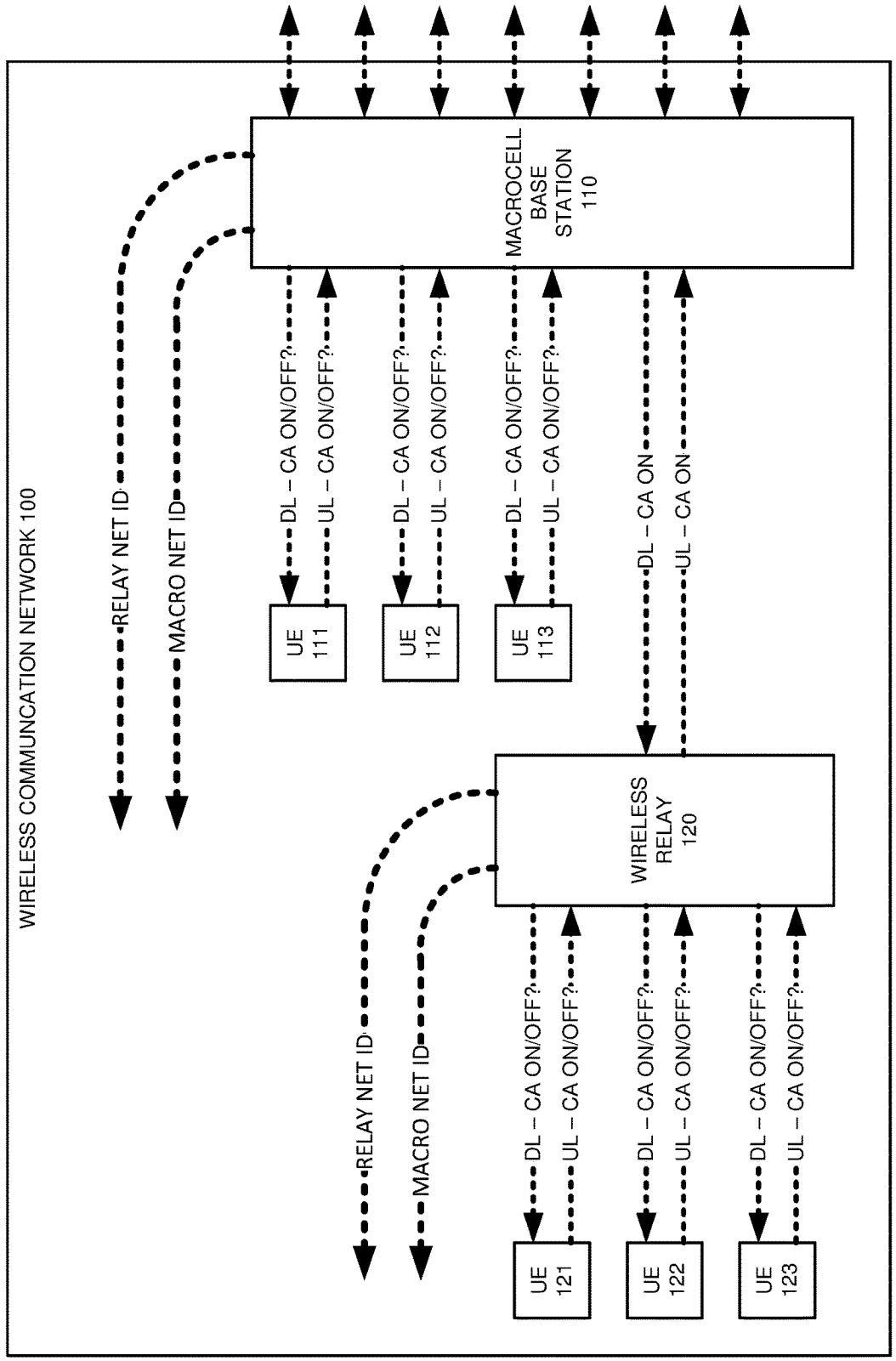
FIG. 1 illustrates a wireless communication network to control Carrier Aggregation (CA) used by wireless relays and User Equipment (UE).

FIG. 1 illustrates wireless communication network 100 to control Carrier Aggregation (CA) used by wireless relay 120 and User Equipment (UEs) 111-113 and 121-123. Wireless communication network 100 comprises macrocell base station 110 and wireless relay 120. Macrocell base station 110 serves a first set of UEs 111-113 by delivering user data services like media conferencing, Internet access, user messaging, and data transfers. Wireless relay 120 serves a second set of UEs 121-123 by delivering these user data services. Macrocell base station 110 serves wireless relay 120 by delivering relay data services like network signaling and relay data tunneling. Wireless relay 120 may also serve other wireless relays with these relay data services.

Macrocell base station 110 comprises antennas, radio heads, baseband units, controllers, and network interfaces. One exemplary base station is a Long Term Evolution (LTE) evolved Node B (eNodeB). Wireless relay 120 comprises antennas, radio heads, baseband units, and controllers. Wireless relay 120 may be an LTE femtocell, picocell, or some other LTE data hub. UEs 111-113 and 121-123 comprise phones, computers, servers, or some other machines with intelligent communication transceivers.

Macrocell base station 110 wirelessly broadcasts a relay network identifier (ID) and a macro network ID. The network IDs are typically Public Land Mobile Network (PLMN) IDs, but other identifying codes could be used like Access Point Names (APNs), Quality-of-Service (QoS) Class IDs (QCIs), Service Set IDs (SSIDs), and Uniform Resource Indicators (URIs)—including combinations thereof.

Likewise, wireless relay 120 wirelessly broadcasts a relay network ID and a macro network ID. UEs 111-113 attach to macrocell base station 110 and UEs 121-123 attach to wireless relay 120 in response to the macro network ID broadcasts. Wireless relay 120 attaches to macrocell base station 110 in response to the relay network ID broadcast. Other wireless relays may attach to macrocell base station 110 or wireless relay 120 in response to the relay network ID broadcasts.

Macrocell base station 110 uses CA to serve UEs 111-113 on the Downlink (DL) and/or the Uplink (UL). Macrocell base station 110 turns this macro network CA on and off based on base station loading. Macrocell base station 110 also uses CA to serve wireless relay 120 on the DL and/or the UL. Macrocell base station 110 typically leaves this relay network CA on—although it could be turned off if necessary.

Wireless relay 120 uses CA to serve UEs 121-123 on the DL and/or the UL. Macrocell base station 110 turns this macro network CA on and off at relay 120 based on its own base station 110 loading. Wireless relay 120 may use CA to serve other wireless relays on the DL and/or the UL. Macrocell base station 110 typically leaves this relay network CA on—although it could be turned off if necessary.

Macrocell base station 110 determines its loading by radio conditions, UE numbers, relay numbers, bandwidth, memory usage, processing capacity, and the like. Macrocell base station 110 compares the loading to one or more thresholds to determine if macro network CA should be turned off and where. For example, macrocell base station 110 may compare its total UE number (all downstream UEs) to a maximum number and begin to selectively turn CA off until UE numbers subside.

To turn off the macro network CA at wireless relay 120, macrocell base station 110 transfers an instruction to wireless relay 120 indicating that CA should be terminated for the macro network ID. In response to the instruction, wireless relay 120 terminates CA for UEs 121-123. The instruction may traverse a link like Radio Resource Control (RRC), System Information Block (SIB), X2, and the like. Wireless relay 120 and macrocell base station 120 continue to use CA for the relay network ID.

Macrocell base station 110 may use various approaches to terminating the CA. For example, base station 110 may initially stop CA for the first set of UEs 111-113 but leave CA on for the second set of UEs 121-123. Macrocell base station 110 then determines if the CA threshold is still exceeded. If the CA threshold is no longer exceeded, then the process may await further changes. If the CA threshold is no longer exceeded, then base station 110 transfers the instruction to wireless relay 120 to terminate CA for the second set of UEs 121-123. In a reciprocal manner, macrocell base station 111 may first stop CA at UEs 121-123, check the CA threshold, and then stop CA at relay 120 if needed. In a relay cascade, the base station may stop CA in a forward or reverse progression through the cascade.

Figure 2:
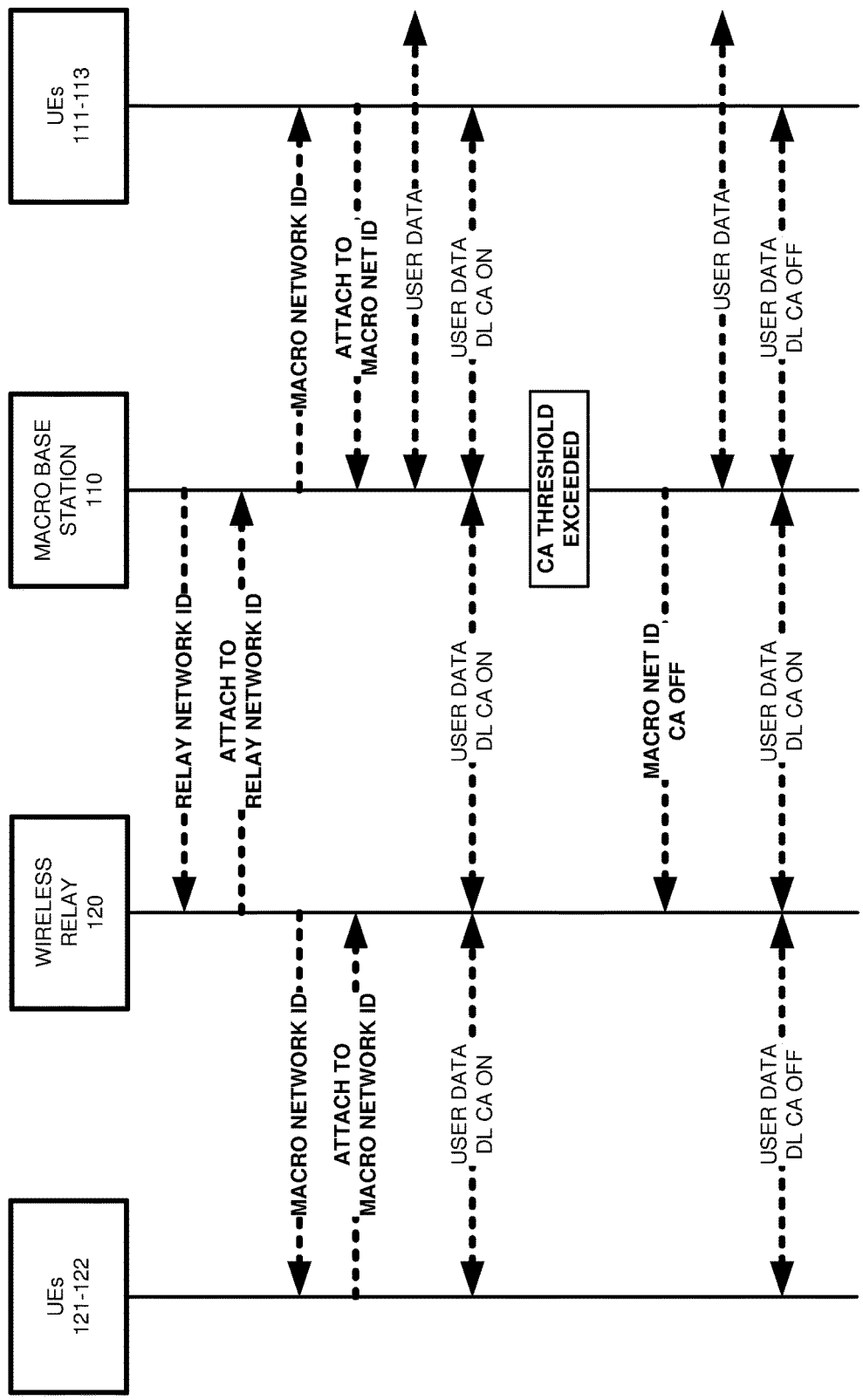
FIG. 2 illustrates the operation of the wireless communication network to control CA used by wireless relays and UEs.

FIG. 2 illustrates the operation of wireless communication network 100 to control DL CA used by wireless relay 120 and UEs 111-113 and 121-123. Macrocell base station 110 wirelessly broadcasts a relay network ID. Wireless relay 120 attaches to macrocell base station 110 in response to the relay network ID broadcast, and other wireless relays may attach to macrocell base station 110 in response to the relay network ID broadcast. Wireless relay 120 wirelessly broadcasts a macro network ID. UEs 111-121 attach to macrocell base station 110 in response to the macro network ID broadcast. Other UEs may attach to wireless relay 120 in response to the macro network ID broadcast. Macrocell base station 110 exchanges user data with various systems. Macrocell base station 110 exchanges some of the user data with UEs 111-113 using DL CA. Macrocell base station 110 exchanges some of the user data wireless relay 120 using DL CA. Wireless relay 120 exchanges this user data with UEs 121-123 using DL CA.

Macrocell base station 110 compares its load metrics to one or more thresholds to determine if macro DL CA should be turned off. In this example, a base station CA ACK threshold is exceeded, so macrocell base station 110 transfers an instruction to wireless relay 120 to turn off DL CA for the macro network ID. Macrocell base station 110 then exchanges additional user data with the external systems. Macrocell base station 110 and UEs 111-113 now exchange user data without using DL CA. Macrocell base station 110 still exchanges some of the user data with wireless relay 120 using DL CA. Wireless relay 120 and UEs 121-123 now exchange user data without using DL CA. Macrocell base station 110 will continue to compare its metrics to the thresholds to determine if macro DL CA should be turned on. If DL CA should be turned on, then macrocell base station 110 transfers an instruction to wireless relay 120 to turn DL CA back on for the macro network ID.

Figure 3:
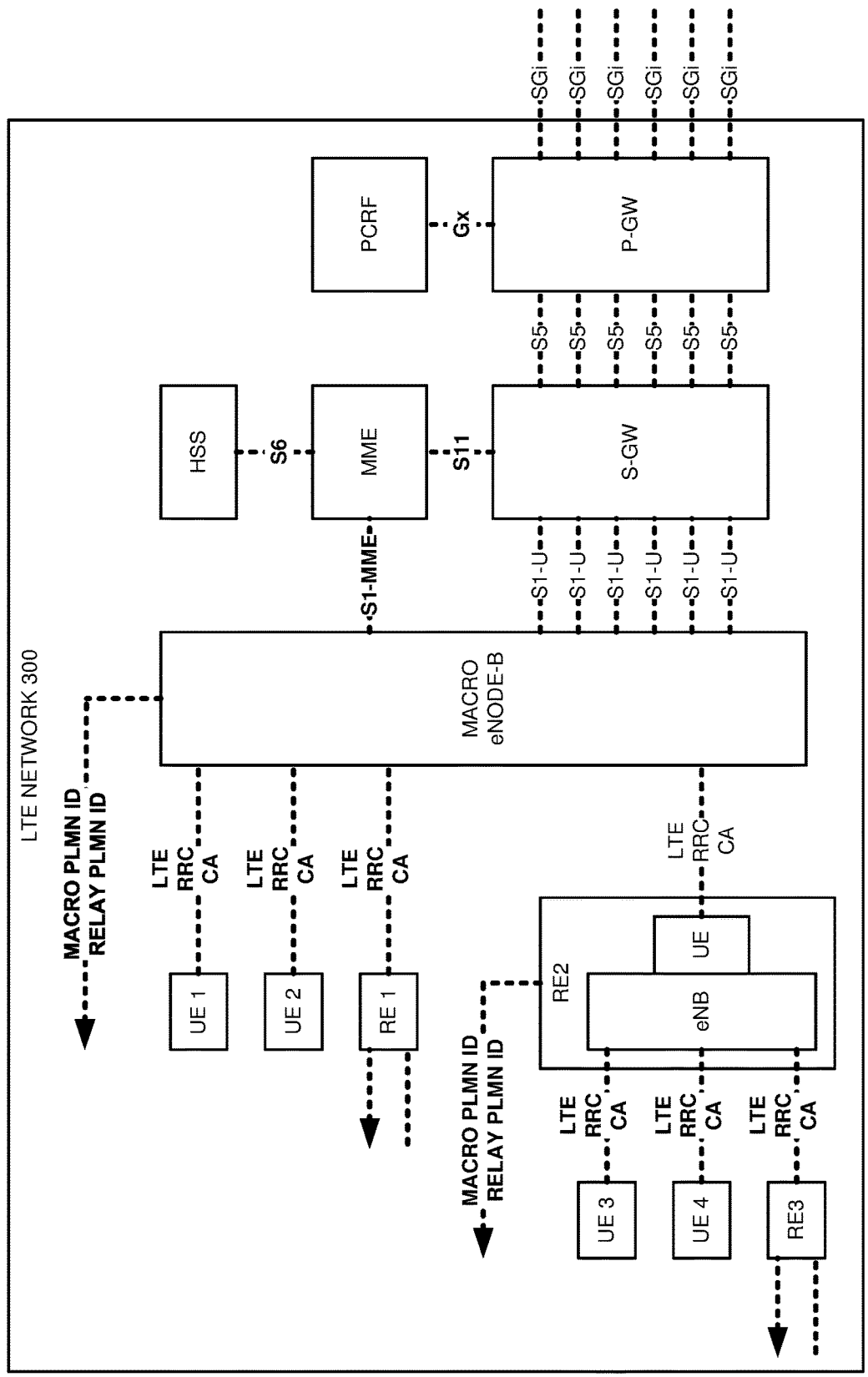
FIG. 3 illustrates a Long Term Evolution (LTE) communication network to control CA used by wireless relays and UEs.

FIG. 3 illustrates Long Term Evolution (LTE) Network 300 to control CA at various eNodeBs—including the eNodeBs that are resident in wireless relays. LTE Network 300 is an example of data communication network 100, although network 100 may use alternative configurations and operations. LTE network 300 comprises: UEs 1-4, Relay Equipment (REs) 1-3, macro eNodeB, Serving Gateway (S-GW), Mobility Management Entity (MME), Home Subscriber System (HSS), Packet Data Network Gateway (P-GW), and Policy Charging and Rules Function (PCRF). RE 2 comprises an eNodeB and a UE that are coupled over a communication system like Ethernet. REs 1 and 3 would be similar.

The macro eNodeB broadcasts a macro PLMN ID, and in response, UEs 1-2 attach to the macro eNodeB. The eNodeBs in REs 1-3 also broadcast a macro PLMN ID, and in response, UEs 3-4 attach to the eNodeB in RE 2. Additional UEs (not shown) attach to REs 1 and 3. The macro eNodeB broadcasts a relay PLMN ID, and in response, REs 1-2 attach to the macro eNodeB. The eNodeBs in REs 1-3 also broadcast a relay PLMN ID, and in response, RE 3 attaches to RE 2. Additional REs (not shown) attach to REs 1 and 3.

UEs 1-2 and the macro eNodeB communicate using LTE RRC and DL CA. REs 1-2 and the macro eNodeB communicate using LTE RRC and DL CA. UEs 3-4 and RE 2 communicate using LTE RRC and DL CA. RE 3 and RE 2 communicate using LTE RRC and DL CA. The macro eNodeB and the MME communicate over an S1-MME link. The macro eNodeB and the S-GW communicate over 51-U links. The S-GW and the P-GW communicate over S5 links. The S-GW and the MME communicate over an S11 link. The MME and the HSS communicate over an S6 link. The P-GW and the PCRF communicate over a Gx link.

The macro eNodeB determines its loading by radio conditions, UE numbers, RE numbers, bandwidth, memory usage, processing capacity, and the like. The macro eNodeB compares the loading to multiple thresholds to determine if macro network DL CA should be turned off and where. For example, the macro eNodeB may compare its total RE numbers (all downstream relays) to a maximum number and begin to selectively turn DL CA off at various relays until the RE numbers subside.

To turn off macro network DL CA, the macro eNodeB transfers an instruction to RE 3 indicating that DL CA should be terminated for the macro PLMN ID. In response to the instruction, RE 3 terminates DL CA for its UEs (not shown). The instruction may traverse an X2 link between the macro eNodeB and the eNodeB in RE 3. If the macro eNodeB threshold is still exceeded, then the macro eNodeB transfers an instruction to REs 1-2 indicating that DL CA should be terminated for the macro PLMN ID. In response to the instruction, RE 1 terminates DL CA for its UEs (not shown), and RE 2 terminates CA for UEs 3-4. The instructions traverse X2 or RRC links between the macro eNodeB and REs 1-2. If the macro eNodeB threshold is still exceeded, then the eNodeB transfers instructions to other REs indicating that CA should be terminated for the macro PLMN ID. If the eNodeB threshold is still exceeded, then the macro eNodeB terminates DL CA for UEs 1-2.

In this example, the macro eNodeB shuts down DL CA at distant relays first and then shuts down CA at relays closer to the macro eNodeB. Finally, the macro eNodeB shuts down its own DL CA. Other progressions could be used. If the eNodeB threshold is still exceeded, then the eNodeB may even transfer instructions to REs 1-3 indicating that DL CA should be terminated for the relay PLMN ID.

To restart macro network CA, the macro eNodeB restarts DL CA with UEs 1-2. The macro eNodeB transfers instructions to REs 1-3 indicating that DL CA should be re-started for the macro PLMN ID. In response to the instruction, REs 1-3 resume CA for their UEs. Various restart progressions could be used.

Figure 4:
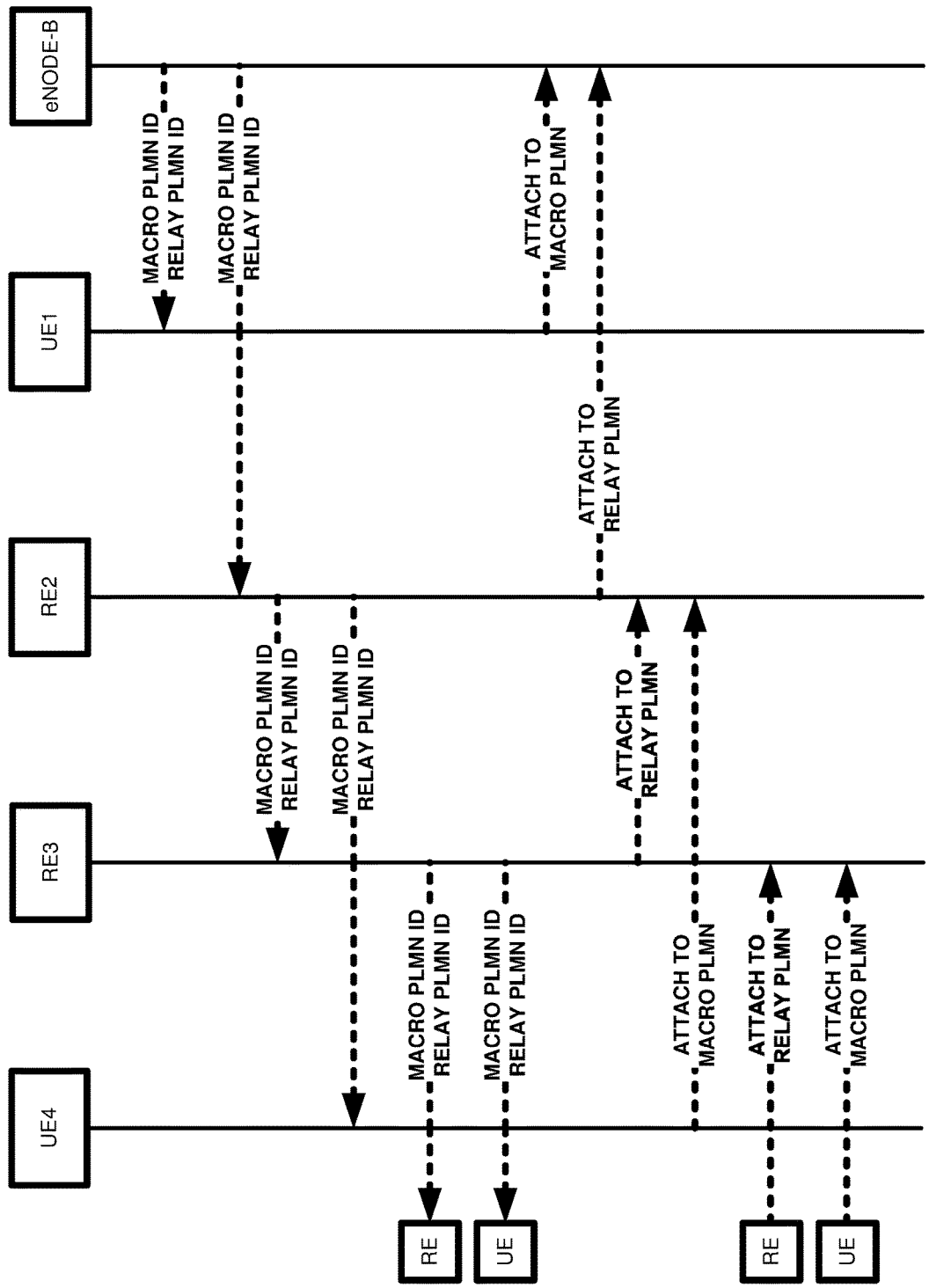
FIG. 4 illustrates the operation of the LTE communication network to control CA used by wireless relays and UEs.
Figure 5:
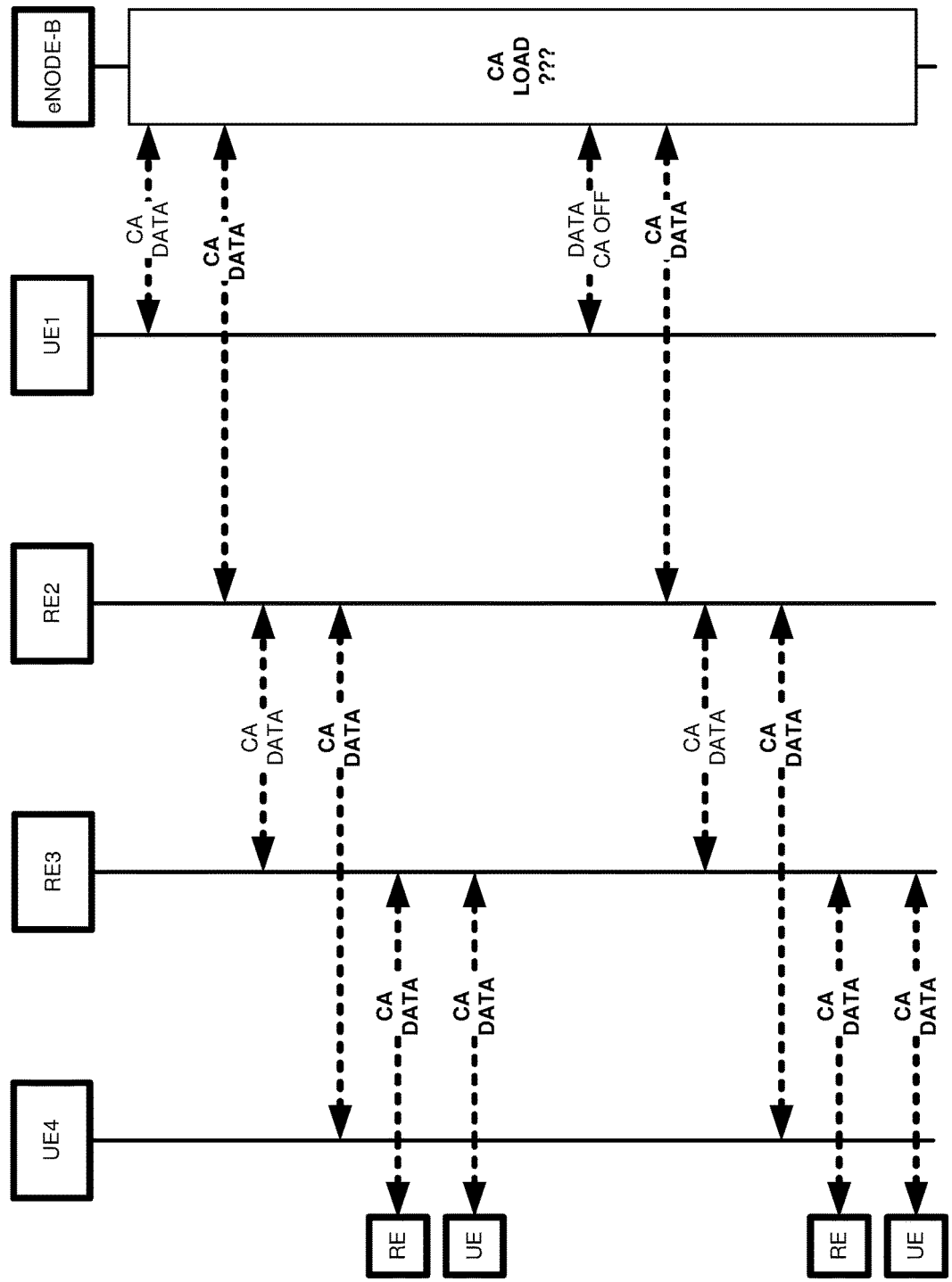
FIG. 5 illustrates the operation of the LTE communication network to control CA used by wireless relays and UEs.
Figure 6:
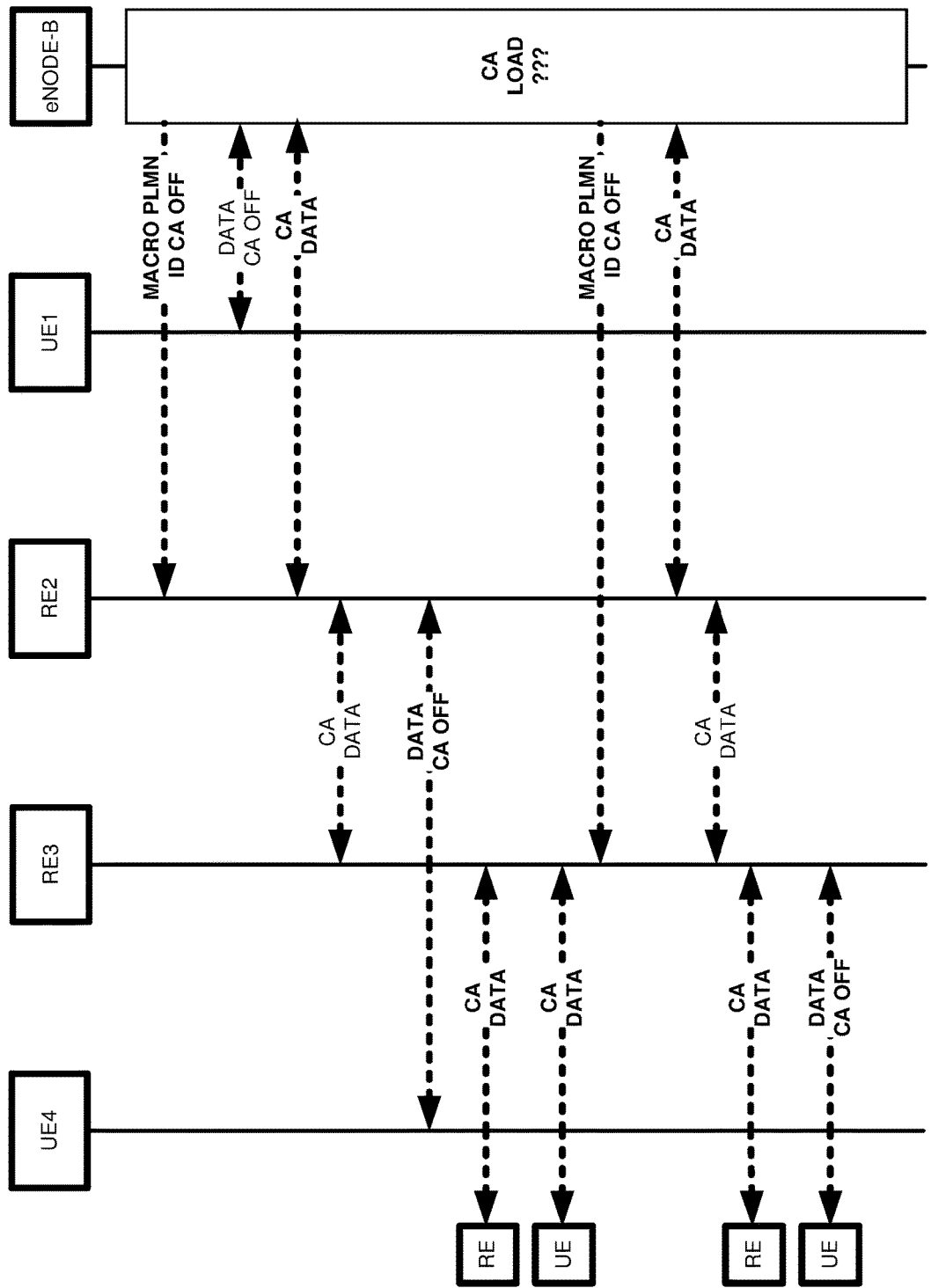
FIG. 6 illustrates the operation of the LTE communication network to control CA used by wireless relays and UEs.

FIGS. 4-6 illustrate the operation of LTE Network 300 to control CA at various eNodeBs. The macro eNodeB broadcasts a macro PLMN ID and a relay PLMN ID. RE 2 broadcasts a macro PLMN ID and a relay PLMN ID. RE 3 also broadcasts a macro PLMN ID and a relay PLMN ID. In response to the macro PLMN ID, UE 1 attaches to the macro eNodeB. In response to the relay PLMN ID, RE 2 attaches to the macro eNodeB. In response to the relay PLMN ID, RE 3 attaches to RE 2. In response to the macro PLMN ID, UE 4 attaches to RE 2. In response to the relay PLMN ID, another RE attaches to the RE 3. In response to the macro PLMN ID, another UE attaches to the RE 3.

Referring to FIG. 5, the macro eNodeB exchanges user data using DL CA with UE 1. The macro eNodeB exchanges user data using DL CA with RE 2. RE 2 exchanges user data using DL CA with RE 3 and UE 4. RE 3 exchanges user data using DL CA with another RE and UE. The macro eNodeB determines its loading by UE and RE numbers, although other factors could be considered. The macro eNodeB compares the RE/UE load to number thresholds to determine if macro network DL CA should be turned off and where.

In this example, macro eNodeB determines that it will initially terminate DL CA for the UEs it serves. The macro eNodeB now exchanges user data with UE 1 without using DL CA. The macro eNodeB and RE 2 still exchange user data using DL CA. RE 2 and RE 3 exchange user data with DL CA. RE 3 and UE 4 exchange user data using DL CA. RE 3 exchanges user data using DL CA with another RE and UE.

Referring to FIG. 6, the macro eNodeB continues to compare its loading to thresholds, and in this example, the macro eNodeB determines that it will now terminate CA for the UEs that are served by RE 2. The macro eNodeB transfers an instruction to RE 2 to terminate DL CA to for the macro PLMN ID. The macro eNodeB still exchanges user data with UE 1 without using DL CA. The macro eNodeB still exchanges user data with RE 2 with DL CA. RE 2 and RE 3 still exchange user data with DL CA. RE 2 and UE 4 now exchange user data without using DL CA. RE 3 exchanges user data with another RE and UE using DL CA.

The macro eNodeB continues to compare loading to thresholds, and in this example, the macro eNodeB determines that it will now terminate CA for the UEs that are served by RE 3. The macro eNodeB transfers an instruction to RE 3 to terminate DL CA to for the macro PLMN ID. The macro eNodeB exchanges user data with UE 1 without DL CA. The macro eNodeB exchanges user data with RE 2 with DL CA. RE 2 and RE 3 exchange user data with DL CA. RE 2 and UE 4 exchange user data without using DL CA. RE 3 exchanges user data with the other RE using DL CA, however, RE 3 now exchanges user data with the other UE without DL CA.

Figure 7:
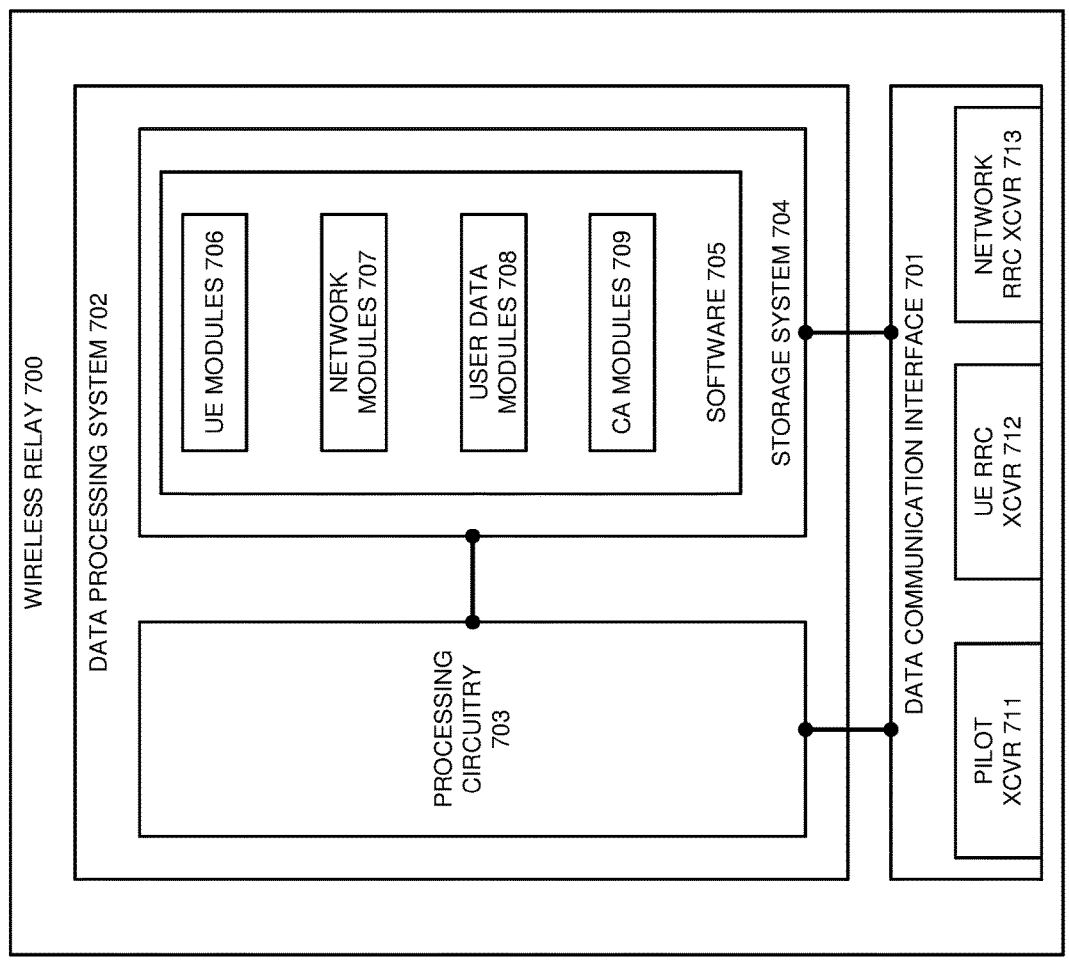
FIG. 7 illustrates a wireless relay to control CA used by UEs.

FIG. 7 illustrates wireless relay 700 to control CA. Wireless relay 700 comprises data communication interface 701 and data processing system 702. Data communication interface 701 comprises communication transceivers 711-713. Data processing system 702 comprises processing circuitry 703 and storage system 704. Storage system 704 stores software 705. Software 705 includes respective software modules 706-709.

Communication transceivers 711-713 comprise pilot transceiver 711, UE Radio Resource Control (RRC) transceiver 712, and network RRC transceiver 713. Pilot transceiver 711 broadcasts one or more macro network IDs and relay network IDs. Communication transceivers 711-713 include communication components, such as antennas, amplifiers, filters, modulators, bus interfaces, signal processors, baseband controllers, memory, software, and the like. Processing circuitry 703 comprises circuit boards, bus interfaces, integrated micro-processing circuitry, and associated electronics. Storage system 704 comprises non-transitory, machine-readable, data storage media, such as flash drives, disc drives, memory circuitry, servers, and the like. Software 705 comprises machine-readable instructions that control the operation of processing circuitry 703 when executed.

Software 705 includes software modules 706-709 and may also include operating systems, hypervisors, applications, data structures, virtual network elements, utilities, and the like. Wireless relay 700 may be centralized or distributed. All or portions of software 706-709 may be externally stored on one or more storage media, such as circuitry, discs, and the like. Some conventional aspects of wireless relay 700 are omitted for clarity, such as power supplies, enclosures, and the like.

When executed by processing circuitry 703, software modules 706-709 direct circuitry 703 to perform the following operations. UE modules 706 interact with UEs and relays over UE RRC transceiver 712—typically using CA. Network modules 707 interact with wireless base stations and relays over network RRC transceiver 713—typically using CA. User data modules 708 exchange user data and associated control signaling between UE modules 706 and Network modules 707. CA modules 709 perform threshold analysis and interact with UE modules 706 and network modules 707 to drive RRC transceivers 712-713 to use CA and to implement CA on/off instructions.

Figure 8:
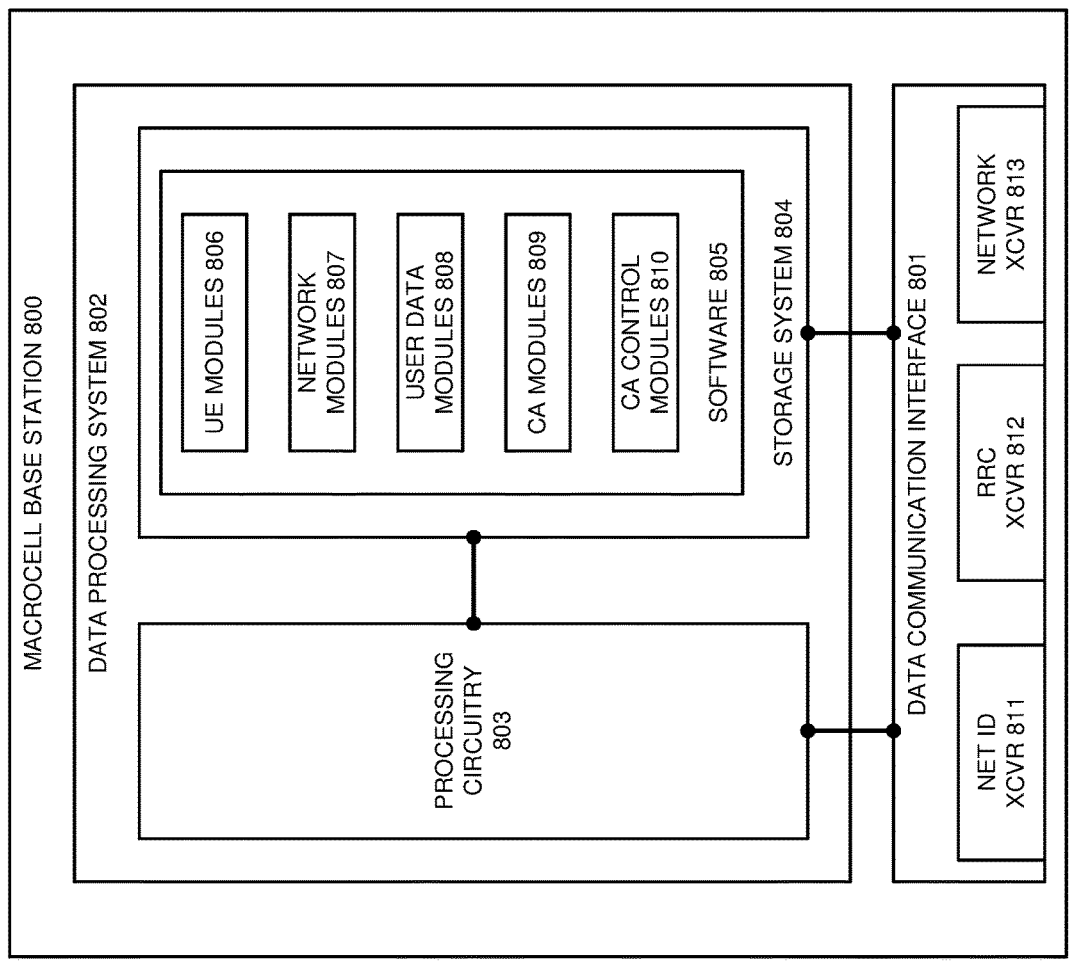
FIG. 8 illustrates a macrocell base station to control CA used by wireless relays and UEs.

FIG. 8 illustrates macrocell base station 800 to control CA at wireless relays. Macrocell base station 800 comprises data communication interface 801 and data processing system 802. Data communication interface 801 comprises communication transceivers 811-813. Data processing system 802 comprises processing circuitry 803 and storage system 804. Storage system 804 stores software 805. Software 805 includes respective software modules 806-809.

Communication transceivers 811-813 comprise pilot transceiver 811, Radio Resource Control (RRC) transceiver 812, and network transceiver 813. Pilot transceiver 811 broadcasts one or more macro network IDs and relay network IDs. Communication transceivers 811-813 include communication components, such as antennas, ports, amplifiers, filters, modulators, bus interfaces, signal processors, baseband controllers, memory, software, and the like. Processing circuitry 803 comprises circuit boards, bus interfaces, integrated micro-processing circuitry, and associated electronics. Storage system 804 comprises non-transitory, machine-readable, data storage media, such as flash drives, disc drives, memory circuitry, servers, and the like. Software 805 comprises machine-readable instructions that control the operation of processing circuitry 803 when executed.

Software 805 includes software modules 806-809 and may also include operating systems, hypervisors, applications, data structures, virtual network elements, utilities, and the like. Macrocell base station 800 may be centralized or distributed. All or portions of software 806-809 may be externally stored on one or more storage media, such as circuitry, discs, and the like. Some conventional aspects of macrocell base station 800 are omitted for clarity, such as power supplies, enclosures, and the like.

When executed by processing circuitry 803, software modules 806-809 direct circuitry 803 to perform the following operations. UE modules 806 interact with UEs and relays over RRC transceiver 812—typically using CA. Network modules 807 interact with network gateways and controllers over network transceiver 813. User data modules 808 exchange user data and associated control signaling between UE modules 806 and Network modules 807. CA modules 809 perform threshold analysis and interact with UE modules 806 to drive RRC transceiver 812 to use CA and to implement CA on/off instructions.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless relay to control carrier aggregation, the method comprising:
    the wireless relay wirelessly receiving a user network Identifier (ID) for a user network and wirelessly receiving a relay network ID for a relay network;
    the wireless relay wirelessly attaching to the relay network responsive to the relay network ID;
    the wireless relay wirelessly broadcasting the user network ID wherein User Equipment (UEs) wirelessly attach to the wireless relay to access the user network responsive to the user network ID;
    the wireless relay wirelessly exchanging user data with the UEs over user network carrier aggregation links;
    the wireless relay wirelessly exchanging the user data with the relay network over relay network carrier aggregation links, wherein the relay network exchanges the user data with the user network;
    responsive to carrier aggregation loading, the wireless relay wirelessly receiving an instruction to terminate the user network carrier aggregation links; and
    the wireless relay terminating the user network carrier aggregation links responsive to the instruction and wirelessly exchanging the user data with the UEs over user network non-carrier aggregation links wherein the wireless relay continues exchanging the user data with the relay network over the relay network carrier aggregation links.

2. The method of claim 1 wherein the wireless relay receiving wirelessly receiving the instruction and terminating the user network carrier aggregation links comprises:
    Relay User Equipment (R-UE) in the wireless relay wirelessly receiving the instruction from the relay network and transferring the instruction to an eNodeB in the wireless relay; and
    the eNodeB in the wireless relay terminating the user network carrier aggregation links responsive to the instruction from the R-UE.

3. The method of claim 1 wherein the wireless relay wirelessly receiving the instruction and
    terminating the user network carrier aggregation links comprises:
    the wireless relay wirelessly receiving a Public Land Mobile Network (PLMN) ID for the user network in the instruction; and
    the wireless relay terminating the user network carrier aggregation links responsive to the PLMN ID for the user network in the instruction.

4. The method of claim 1 wherein the user network ID and the relay network ID comprise Public Land Mobile Network (PLMN) IDs.

5. The method of claim 1 wherein the wireless relay wirelessly receiving the instruction to terminate the user network carrier aggregation links comprises the wireless relay wirelessly receiving Radio Resource Control (RRC) signaling.

6. The method of claim 1 wherein the wireless relay wirelessly receiving the instruction to terminate the user network carrier aggregation links comprises the wireless relay wirelessly receiving System Information Block (SIB) information.

7. The method of claim 1 wherein the carrier aggregation loading comprises excessive relay network carrier aggregation loading.

8. The method of claim 1 wherein the carrier aggregation loading comprises excessive user network carrier aggregation loading.

9. The method of claim 1 wherein the user network carrier aggregation links comprise downlink communication links.

10. The method of claim 1 wherein the user network carrier aggregation links comprise uplink communication links.

11. A wireless relay to control carrier aggregation comprising:
    data communication transceivers in the wireless relay configured to wirelessly receive a user network Identifier (ID) for a user network, wirelessly receive a relay network ID for a relay network, wirelessly attach to the relay network responsive to the relay network ID, and wirelessly broadcast the user network ID to User Equipment (UEs), wherein the UEs are configured to wirelessly attach to the wireless relay to access the user network responsive to the user network ID;
    the data communication transceivers in the wireless relay configured to wirelessly exchange user data with the UEs over user network carrier aggregation links and wirelessly exchange the user data with the relay network over relay network carrier aggregation links wherein the relay network is configured to exchange the user data with the user network;
    the data communication transceivers in the wireless relay further configured to wirelessly receive an instruction to terminate the user network carrier aggregation links responsive to carrier aggregation loading;

data processing circuitry in the wireless relay configured to terminate the user network carrier aggregation links responsive to the instruction; and the data communication transceivers in the wireless relay further configured to wirelessly exchange the user data with the UEs over user network non-carrier aggregation links and configured to continue exchanging the user data with the relay network over the relay network carrier aggregation links.

12. The wireless relay of claim 11 wherein the wireless relay comprises:

Relay User Equipment (R-UE) having the data communication transceivers to wirelessly receive the instruction from the relay network and transfer the instruction to an eNodeB in the wireless relay; and the eNodeB in the wireless relay configured to terminate the user network carrier aggregation links responsive to the instruction from the R-UE.

13. The wireless relay of claim 11 wherein:

the data communication transceivers in wireless relay are further configured to wirelessly receive a Public Land Mobile Network (PLMN) ID for the user network in the instruction; and the data processing circuitry is further configured to terminate the user network carrier aggregation links responsive to the PLMN ID for the user network in the instruction.

14. The wireless relay of claim 11 wherein the user network ID and the relay network ID comprise Public Land Mobile Network (PLMN) IDs.

15. The wireless relay of claim 11 wherein the data communication transceivers are configured to wirelessly receive the instruction over Radio Resource Control (RRC) signaling.

16. The wireless relay of claim 11 wherein the wherein the data communication transceivers are configured to wirelessly receive the instruction in System Information Block (SIB) information.

17. The wireless relay of claim 11 wherein the carrier aggregation loading comprises excessive relay network carrier aggregation loading.

18. The wireless relay of claim 11 wherein the carrier aggregation loading comprises excessive user network carrier aggregation loading.

19. The wireless relay of claim 11 wherein the user network carrier aggregation links comprise downlink communication links.

20. The wireless relay of claim 11 wherein the user network carrier aggregation links comprise uplink communication links.

* * * * *